May 14, 1957 L. S. CAMP 2,792,156
PIE FILLER DISPENSER
Filed Aug. 23, 1954. 3 Sheets-Sheet 3
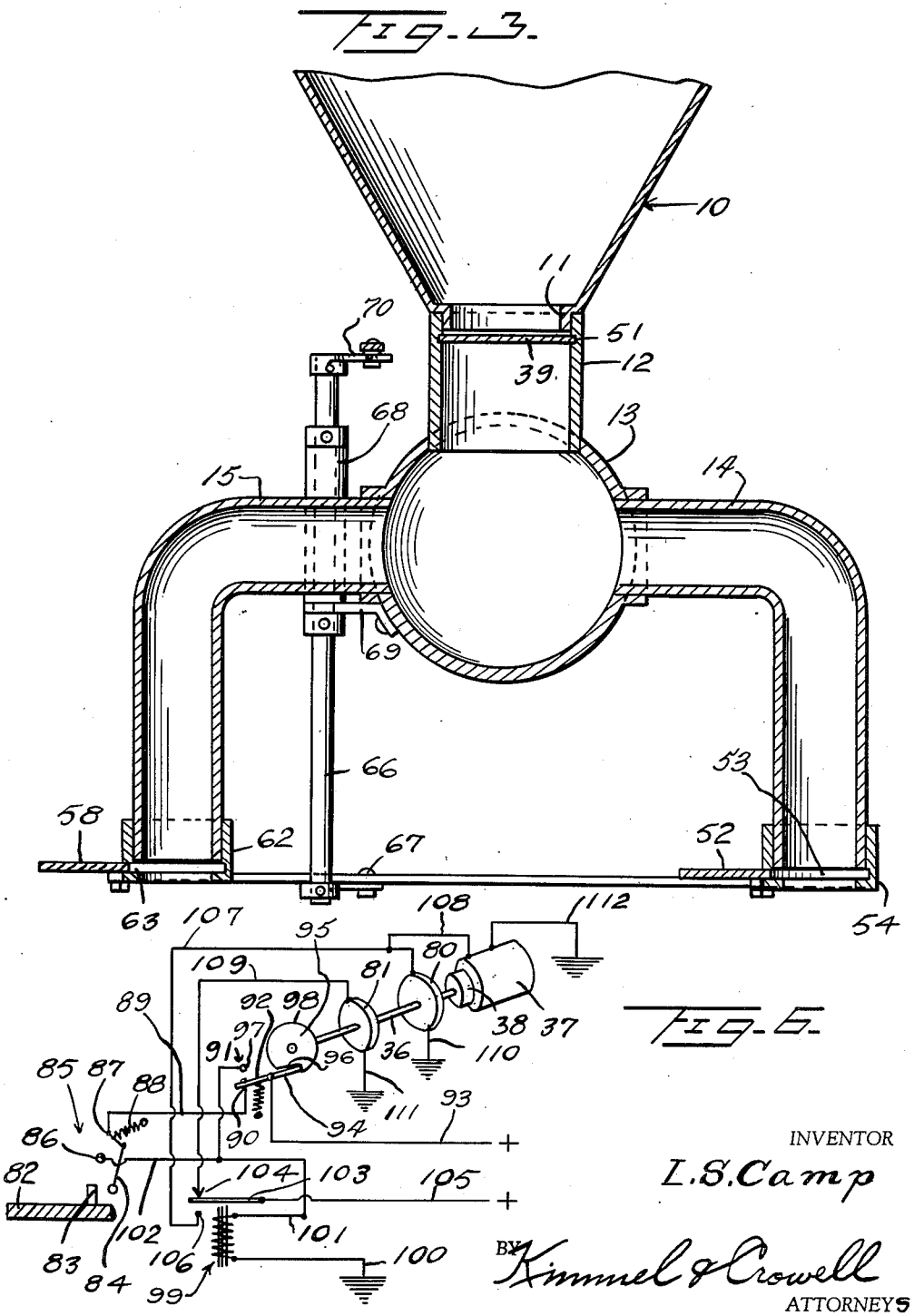
INVENTOR
L.S.Camp
BY Kimmel & Crowell
ATTORNEYS United States Patent Office 2,792,156
Patented May 14, 1957

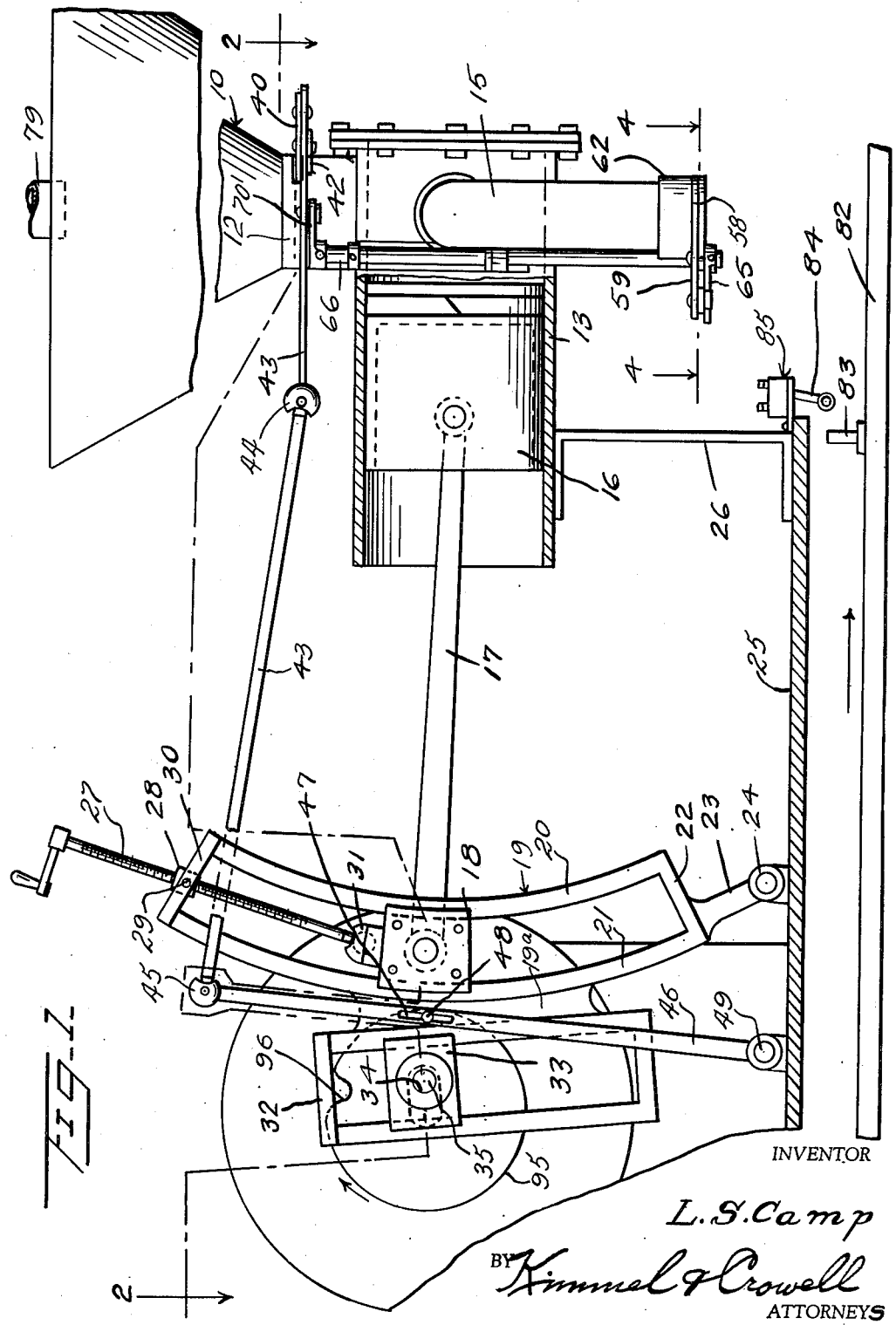

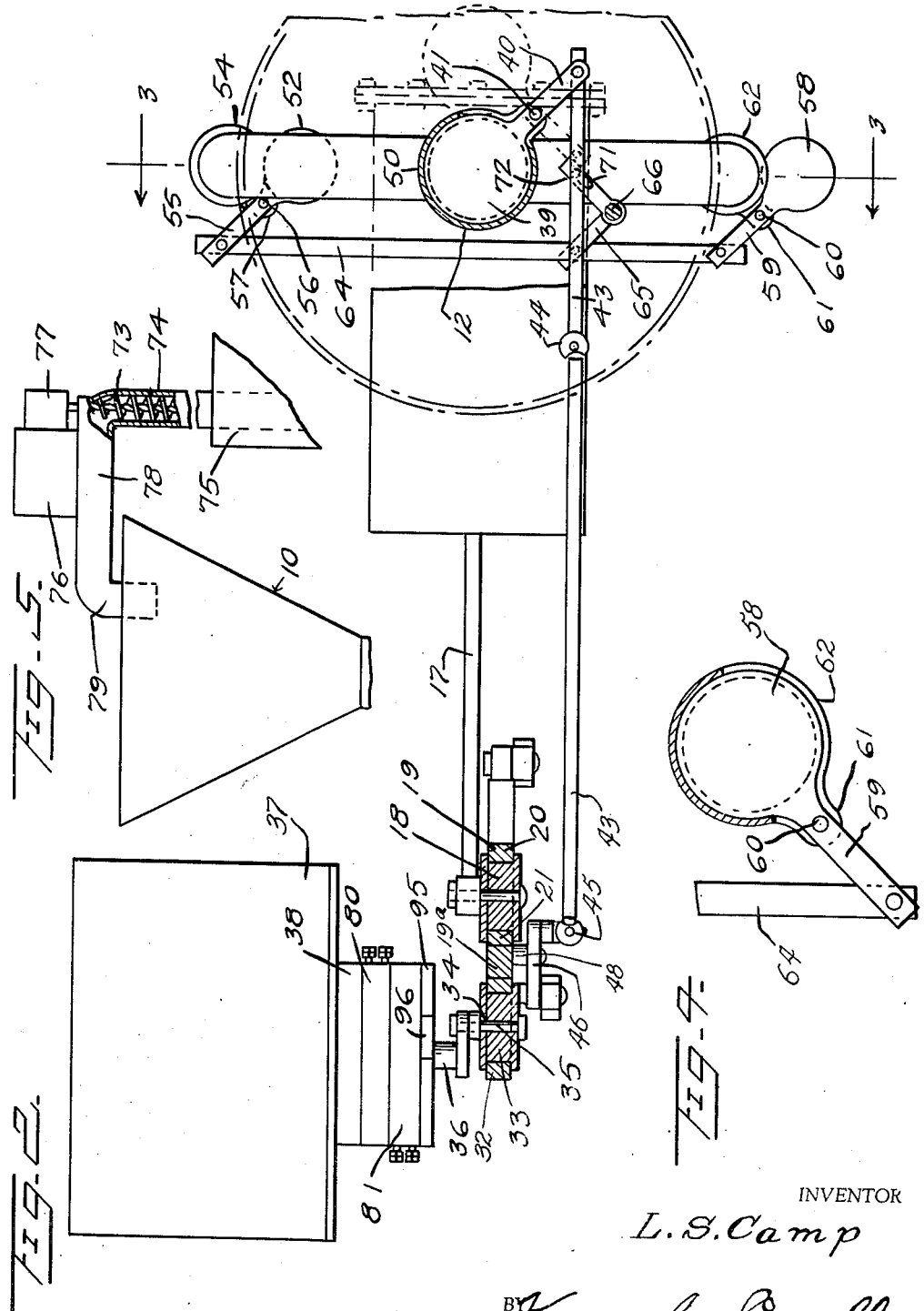

2,792,156
PIE FILLER DISPENSER
Luther S. Camp, Lindale, Ga.
Application August 23, 1954, Serial No. 451,633
3 Claims. (Cl. 222—309)

This invention relates to an improved means for discharging pie filling material onto the pie dough.

An object of this invention is to provide a dispenser adapted to discharge a measured quantity of pie filling material onto pie dough which is disposed on a continuously moving conveyor.

Another object of this invention is to provide a pie filling dispenser which includes a reciprocating plunger and oppositely movable valves associated therewith, the plunger being connected to a crosshead by an adjustable connection so that the amount of material discharged may be varied.

A further object of this invention is to provide a dispenser of this kind which can be easily cleaned and kept in a sanitary condition.

With the above and other objects in view, my invention consists in the arrangement, combination and details of construction disclosed in the drawings and specification, and then more particularly pointed out in the appended claims.

In the drawings:

Figure 1 is a detailed side elevation, partly broken away and in section, of a pie filler constructed according to an embodiment of this invention.

Figure 2 is a fragmentary sectional view taken on the line 2—2 of Figure 1.

Figure 3 is a fragmentary sectional view taken on the line 3—3 of Figure 2.

Figure 4 is a sectional view taken on the line 4—4 of Figure 1.

Figure 5 is a fragmentary side elevation, partly in section, of the hopper filling mechanism.

Figure 6 is a diagrammatic view showing the electric circuits embodied in this invention.

Referring to the drawings, the numeral 10 designates generally a hopper which is of tapered construction and terminates at its lower end in a reduced diameter discharge nipple 11 engaging in the upper end of a vertical nipple 12 carried by the forward end portion of a cylinder 13. The cylinder 13 has extending from diametrically opposed points adjacent the forward end thereof a pair of L-shaped discharge pipes 14 and 15.

The lower ends of these discharge pipes 14 and 15 are adapted to overlie a continuously moving conveyor on which empty pie crusts are disposed so that the pie filling material flowing downwardly through the discharge members or pipes 14 and 15 will drop into the pie crusts.

The cylinder 13 has slidable therein a plunger or piston 16 with which one end of a connecting rod 17 is pivotally engaged. The connecting rod 17 at its rear end is connected to a vertically adjustable block 18 which is disposed in an arcuate guide 19.

The arcuate guide 19 is formed of a pair of arcuate bars 20 and 21 connected together at their lower ends by means of a connecting member 22, and a lever or arm 23 extends downwardly from the connecting member 22 and is pivotally mounted as at 24 on a base 25. The cylinder 13 is supported from the base 25 by means of a U-shaped supporting member 26.

The block 18 is adjusted lengthwise of the guide 19 by means of a screw shaft 27 which is threaded through a nut 28 pivotally mounted as at 29 in a connecting bar 30 extending between the upper ends of the arcuate bars 20 and 21. The lower end of the screw shaft 27 is swivelly connected as at 31 to the block 18.

A rectangular crosshead 32 is positioned adjacent the guide 19 and has a slide block 33 mounted therein. The block 33 has an opening 34 in which a crank pin 35 rotatably engages. The crank pin 35 is carried by a drive shaft 36 which is connected to a power member 37 through a reduction gearing 38. A connector block 19a is positioned between the guide 19 and the crosshead 32 and is welded or otherwise integrally connected to both the guide 19 and the crosshead 32.

A cut-off valve 39 is disposed in the upper portion of the nipple 12 and is constructed in the form of a disc-shaped plate having a radial arm 40 extending therefrom and pivoted as at 41 on an ear 42 which is fixed to the nipple 12.

The arm or lever 40 has connected therewith a rod 43 which is formed between the ends thereof with a universal joint 44, and the rear end of rod 43 is connected through a universal joint 45 to a rock lever 46. The lever 46 is formed with an elongated opening 47 between the ends thereof in which a pin 48 is loosely mounted. The pin 48 is mounted in the connector block 19a so that it is fixed relative to the guide 19. The lower end of the lever 46 is pivotally mounted as at 49 on the base 25.

The nipple 12 is formed with a substantially semi-circular opening 50 through which the valve 39 is adapted to swing and when in closed position the valve 39 engages in a semi-circular groove 51 which is formed in the nipple 12.

The lower end of discharge pipe 14 has associated therewith a disc-shaped valve 52 which is movable through an opening 53 formed in a cap 54 mounted on the lower end of pipe 14. Valve 52 has extending therefrom an arm 55, and arm 55 is pivotally mounted as at 56 on an ear 57 carried by the cap 54.

The lower end of pipe 15 has associated therewith a valve 58 which has extending therefrom an arm 59 pivotally mounted as at 60 on an ear 61 extending from a cap 62. The cap 62 is formed with an opening 63 within which the valve 58 is adapted to movably engage.

The two arms 55 and 59 are connected together by means of a link 64, and link 64 is moved laterally by means of an arm 65 secured to a vertical shaft 66. The outer end of arm 65 is pivotally connected as at 67 to link 64.

Shaft 66 rotatably engages through a vertically disposed bearing 68 supported laterally of the cylinder 13 by means of a bracket 69.

The upper end of shaft 66 has fixed thereto an arm or crank member 70 having an elongated slot 71 through which a pin 72 loosely engages. The pin 72 extends through the forward portion of rod 43.

The two valves 52 and 58 move to open or closed position as a unit, and valve 39 moves oppositely from the valves 52 and 58. In other words, when valves 52 and 58 are in open position, as shown in Figure 3, valve 39 is in closed position.

The hopper 10, as shown in Figure 5, is adapted to be maintained in a substantially filled condition by means of a screw conveyor 73 mounted in a vertically disposed conveyor tube 74. The tube 74 is adapted to be extended into a supply reservoir or container 75, and screw conveyor 73 is operated by means of a power member 76 connected with the conveyor 73 by a reduction gearing 77.

A horizontally disposed upper extension 78 extends from the conveyor tube 74 and a depending discharge neck 79 extends from the extension 78 and is disposed in the upper portion of hopper 10.

The discharge of the filling material from the discharge members or nozzles 14 and 15 is intermittently effected by intermittent operation of the power member 37 as follows: Shaft 36 is connected to the armature shaft of motor 37 through an electric clutch 80, and an electric brake 81 is adapted to stop rotation of shaft 36 after each complete revolution as will be hereinafter described.

The conveyor 82 has a switch operating pin 83 secured thereto which is adapted to strike switch lever 84 carried by switch 85. Switch 85 includes a pair of contacts 86 and 87 engaged by wiper 88 which is fixed relative to lever 84. Contact 87 is connected by a conductor 89 to a contact 90 of a cam operated switch 91. A spring pressed switch arm 92 normally engages contact 90 and arm 92 is connected by conductor 93 to one side of a supply source.

Arm 92 includes an extension 94 engageable with a cam wheel 95 fixed on shaft 36. Cam wheel 95 is entirely circular except for a depression or cutout 96 which effects rocking of lever 92 to engage contact 90. Switch 91 includes a second contact 97 with which arm 92 is engaged when extension 94 engages the circular portion 98 of cam 95.

A slow releasing relay 99 has one side thereof connected to the ground by a conductor 100, and the other side of relay 99 is connected by conductor 101 to contact 97. A conductor 102 is connected between conductor 101 and contact 86 of switch 85. Relay 99 includes an armature or switch arm 103 spring biased to engage contact 104, and arm 103 is connected by conductor 105 to one side of the supply source. A second contact 106 is associated with the relay switch 99 and is connected by conductor 107 to one side of clutch 80 and by conductor 108 to motor 37. Contact 104 is connected by conductor 109 to one side of brake 81. The other sides of clutch 80 and brake 81 are connected to ground by conductors 110 and 111 respectively, and motor 37 is connected to the ground by conductor 112.

In the use and operation of this device conveyor 82 is movable continuously and the pie pans with the pie crusts are placed on top of conveyor at spaced intervals adjacent the pins 83. Switch arm 103 will be normally closed to brake 81 through contact 104 and conductor 107. When pin rocks lever 84 to the right, wiper 88 will bridge contacts 86 and 87 and will energize relay 99 from switch 91 through conductors 93, 89, 102 and 101, so that brake 81 will be released or deenergized and clutch 80 will be operative. When arm 103 engages contact 106 upon energizing of relay 99, clutch 80 will be energized through conductor 107 and at the same time motor 37 will be energized through conductor 108.

When shaft 36 partially turns extension 94 will move out of recess 96 and engage the periphery of cam wheel 95, thereby effecting rocking of arm 92 to engage contact 97. At this time the circuit to relay is closed from conductor 103, arm 92 and conductor 101. Motor 37 will at this time make a complete revolution of shaft 36. Crank pin 35 will make a complete turn moving piston 16 forwardly to discharge the filling from nozzles 14 and 15. As piston 16 moves forwardly on the discharge stroke, valve 39 is closed and valves 52 and 58 are opened.

The length of stroke of the plunger or piston 16 is regulated by adjustment of the block 18 in the guide 19. When plunger 16 is moving forwardly, valve 39 is moved to a closed position, and at the same time valves 52 and 58 are moved to an open position. On the back stroke of piston or plunger 16, valve 39 is moved to an open position and at the same time valves 52 and 58 are moved to a closed position.

This device will provide a means whereby measured quantities of filler material may be discharged into pie crusts or other bakery products and the operation will be performed in a substantially continuous process.

With a device as hereinbefore described, there will be equal quantities of filler material in each of the bakery products.

What is claimed is:

1. A filler dispenser for bakery goods comprising a hopper, a horizontal cylinder at the lower end of said hopper, a pair of discharge tubes extending laterally and downwardly from said cylinder, a piston slidable in said cylinder, operating means for said piston, said operating means including means for varying the length of stroke of said piston, a cut-off valve between said hopper and said cylinder, a valve at the lower end of each discharge tube, crank means moving said cut-off valve to open position with outward movement of said piston and to closed position with inward movement of said piston, and crank means for moving said pair of valves oppositely from said cut-off valve.

2. A filler dispenser for bakery goods comprising a hopper, a horizontal cylinder at the lower end of said hopper, a pair of discharge tubes extending laterally and downwardly from said cylinder, a piston slidable in said cylinder, operating means for said piston, said operating means including a rock lever, means pivotally supporting one end of said lever, a piston rod connected between said lever and said piston, a drive means connected to said lever, a cut-off valve between said hopper and said cylinder, a valve at the lower end of each discharge tube, crank means moving said cut-off valve to open position with outward movement of said piston and to closed position with inward movement of said piston, and crank means for moving said pair of valves oppositely from said cut-off valve.

3. A filler dispenser for bakery goods comprising a hopper, a horizontal cylinder at the lower end of said hopper, a pair of discharge tubes extending laterally and downwardly from said cylinder, a piston slidable in said cylinder, operating means for said piston, said operating means including a rock lever, means pivotally supporting one end of said lever, a slide block carried by said lever, means adjusting said block lengthwise of said lever, a piston rod pivotally connected between said block and said piston, a drive means connected to said lever, a cut-off valve between said hopper and said cylinder, a valve at the lower end of each discharge tube, crank means moving said cut-off valve to open position with outward movement of said piston and to closed position with inward movement of said piston, and crank means for moving said pair of valves oppositely from said cut-off valve.

References Cited in the file of this patent

UNITED STATES PATENTS

| | | |
|---|---|---|
| 1,122,334 | Taylor | Dec. 29, 1914 |
| 2,340,536 | Joplin | Feb. 1, 1944 |
| 2,388,036 | Bingham | Oct. 30, 1945 |